United States Patent [19]

Gonczy et al.

[11] Patent Number: 5,308,421
[45] Date of Patent: May 3, 1994

[54] METHOD FOR FORMING FIBER-REINFORCED GLASS COMPOSITE PROTECTIVE LAYERS ON INSULATING BODIES

[75] Inventors: Stephen T. Gonczy, Mt. Prospect; Roger Y. Leung, Schaumburg, both of Ill.

[73] Assignee: Allied-Signal Inc., Morris Township, Morris County, N.J.

[21] Appl. No.: 685,303

[22] Filed: Apr. 12, 1991

[51] Int. Cl.$^5$ .......................... C04B 37/00; B05D 3/02
[52] U.S. Cl. .................................. 156/89; 156/307.1; 427/226; 427/314; 427/372.2
[58] Field of Search ................. 156/89, 307.1; 264/60, 264/62, 257, 258, 263; 427/226, 314, 372.2

[56] References Cited

U.S. PATENT DOCUMENTS

| | | | |
|---|---|---|---|
| 3,944,519 | 3/1976 | Mink et al. | 260/46.5 |
| 4,234,713 | 11/1980 | LeGrow | 528/15 |
| 4,460,638 | 7/1984 | Haluska | 428/224 |
| 4,460,639 | 7/1984 | Chi et al. | 428/224 |
| 4,460,640 | 7/1984 | Chi et al. | 428/224 |

OTHER PUBLICATIONS

Prewo et al., "Fiber Reinforced Glasses and Glass--Ceramics for High Performance Applications", Ceramic Bulletin, vol. 65, No. 2 (1986) pp. 305–313.

*Primary Examiner*—Jan H. Silbaugh
*Assistant Examiner*—Christopher A. Fiorilla
*Attorney, Agent, or Firm*—Harold N. Wells; Mary Jo Boldingh; Gerhard H. Fuchs

[57] ABSTRACT

An improved protective layer for ceramic insulating bodies includes a composite having a refractory fiber in a matrix of a black glass ceramic having the empirical formula $SiC_xO_y$ where x ranges from about 0.5 to about 2.0, preferably 0.9 to 1.6 and y ranges from about 0.5 to 3.0, preferably 0.7 to 1.8. The black glass ceramic is derived from cyclosiloxane monomers containing a vinyl group attached to silicon and/or a hydride-silicon group. The protective layer is formed by laying up plies of a prepreg on the insulating body following by pressing, curing and pyrolyzing said prepreg to form said protective layer.

5 Claims, No Drawings

METHOD FOR FORMING FIBER-REINFORCED GLASS COMPOSITE PROTECTIVE LAYERS ON INSULATING BODIES

PRIOR ART

The invention relates generally to composites in which a matrix material is reinforced with fibers and applied as a protective layer to ceramic insulating bodies, such as compressed fibers, foams and honeycomb.

In certain applications metal oxides, such as silica, alumina, magnesia, zirconia and the like, are useful for their insulating properties and high temperature resistance in the form of compressed fibers or foams. However, they are not inherently as strong or abrasion resistant as would be desired and, consequently, a metal skin may be used to protect such ceramic substrates. Applying a metal layer over such ceramic is difficult and adds undesirable weight.

It has now been found that adding a composite skin consisting of fiber-reinforced matrix of black glass as a protective layer to ceramic substrates has advantages over the use of metals, particularly for aerospace applications.

Matrices having enhanced performance have been suggested for use with fibers having high strength at elevated temperatures. Examples of such matrix materials are the glass and glass ceramics (Prewo et al., Ceramic Bulletin, Vol. 65, No. 2, 1986).

In USSN 002,049 a ceramic composition designated "black glass" is disclosed which has an empirical formula SiCxOy where x ranges from about 0.5 to about 2.0 and y ranges from about 0.5 to about 3.0, preferably x ranges from 0.9 to 1.6 and y ranges from 0.7–1.8. Such a ceramic material has a higher carbon content than prior art materials and is very resistant to high temperatures—up to about 1400° C. This black glass material is produced by reacting in the presence of a hydrosilylation catalyst a cyclosiloxane having a vinyl group with a cyclosiloxane having a hydrogen group to form a polymer, which is subsequently pyrolyzed to black glass. The present invention involves the application of such black glass with reinforcing fibers to form a protective skin for ceramic insulating bodies especially useful for high temperature applications.

In U.S. Pat. No. 4,460,638 a fiber-reinforced glass composite is disclosed which employs high modulus fibers in a matrix of a pyrolyzed silazane polymer. Another possible matrix material is the resin sol of an organosilsesquioxane, as described in U.S. Pat. No. 4,460,639. However, such materials are hydrolyzed, and since they release alcohols and contain excess water, they must be carefully dried to avoid fissures in the curing process.

Another U.S. Pat. No. 4,460,640, disclosed related fiber-reinforced glass composites using organopolysiloxane resins of U.S. Pat. No. 3,944,519 and U.S. Pat. No. 4,234,713 which employ crosslinking by the reaction of ≡SiH groups to CH$_2$=CHSi≡ groups. These later two patents have in common the use of organosilsesquioxanes having C$_6$H$_5$SiO$_{3/2}$ units, which have been considered necessary by the patentees to achieve a flowable resin capable of forming a laminate. A disadvantage of such C$_6$H$_5$SiO$_{3/2}$ units is their tendency to produce free carbon when pyrolyzed. The present invention requires no such C$_6$H$_5$SiO$_{3/2}$ units and still provides a flowable resin, and does not produce easily oxidized carbon.

Another disadvantage of the organopolysiloxanes used in the '640 patent is their sensitivity to water as indicated in the requirement that the solvent used be essentially water-free. The resins contain silanol groups and when these are hydrolyzed they form an infusible and insoluble gel. The present invention requires no such silanol groups and is thus insensitive to the presence of water. In addition, the organopolysiloxanes of the '640 patent may not have a long shelf life while those of the present invention remain stable for extended periods. Still another disadvantage for the organopolysiloxanes disclosed in the '640 patent is that they require a partial curing step before pressing and final curing. This operation is difficult to carry out and may prevent satisfactory lamination if the polymer is over cured. The present invention requires no pre-curing step.

SUMMARY OF THE INVENTION

An improved protective skin for ceramic insulating bodies is a fiber-reinforced glass composite comprising (a) at least one refractory fiber selected from the group consisting of boron, silicon carbide, graphite, silica, quartz, S-glass, E-glass, alumina, aluminosilicate, boron nitride, silicon nitride, silicon carbonitride, silicon oxycarbonitride, boron carbide, titanium boride, titanium carbide, zirconium oxide, and zirconia-toughened alumina and, (b) a carbon-containing black glass ceramic composition having the empirical formula SiCxOy where x ranges from about 0.5 to about 2.0, preferably from 0.9 to 1.6, and y ranges from about 0.5 to about 3.0, preferably from 0.7 to 1.8. The fibers optionally may be coated with carbon, boron nitride or other coatings to affect the bond between the fiber and the black glass matrix.

In a preferred embodiment, the black glass ceramic composition (b) is the pyrolyzed reaction product of a polymer prepared from (1) a cyclosiloxane monomer having the formula

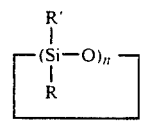

where n is an integer from 3 to about 30, R is hydrogen, and R' is an alkene of from 2 to about 20 carbon atoms in which one vinyl carbon atom is directly bonded to silicon or (2) two or more different cyclosiloxane monomers having the formula of (1) where for at least one monomer R is hydrogen and R' is an alkyl group having from 1 to about 20 carbon atoms and for the other monomers R is an alkene from about 2 to about 20 carbon atoms in which one vinyl carbon is directly bonded to silicon and R' is an alkyl group of from 1 to about 20 carbon atoms, or (3) cyclosiloxane monomers having the formula of (1) where R and R' are independently selected from hydrogen, an alkene of from 2 to about 20 carbon atoms in which one vinyl carbon atom is directly bonded to silicon, or an alkyl group of from 1 to about 20 carbon atoms and at least some of said monomers contain each of said hydrogen, alkene, and alkyl moieties, said polymerization reaction taking place in the presence of an effective amount of hydrosilylation catalyst. The polymer product is pyrolyzed at a temperature in the range of about 800° C. to about 1400° C. to produce the black glass ceramic, preferably in a non-oxidizing atmosphere.

In another embodiment the invention comprises a method of applying a fiber-reinforced black glass matrix composite wherein the cyclosiloxane reaction product described above is combined with refractory fibers, which may be in the form of woven fabric or unidirectionally aligned fibers. Plies of the resin impregnated fibers may be laid-up to form a green laminate and thereafter applied to a ceramic insulating substrate and then pyrolyzed at a temperature between about 800° C. and about 1400° C., preferably about 850° C., to form the black glass composite. The composite may be reimpregnated with polymer solution and repyrolyzed in order to increase density of the black glass skin.

The ceramic substrate may be in the form of consolidated fibers, open-cell foams, closed-cell foams, or consolidated powders and comprise materials including alumina, silica, zirconia, mullite, magnesia, silicon carbide, silicon nitride and the like.

DESCRIPTION OF THE PREFERRED EMBODIMENTS

Black Glass Ceramic

The black glass ceramic used as the matrix has an empirical formula SiCxOy wherein x ranges from about 0.5 to about 2.0, preferably 0.9–1.6, and y ranges from about 0.5 to about 3 0, preferably 0.7–1.8, whereby the carbon content ranges from about 10% to about 40% by weight. The black glass ceramic is the product of the pyrolysis at temperatures between about 800° C. and about 1400° C. of a polymer made from certain siloxane monomers.

The polymer precursor of the black glass ceramic may be prepared by subjecting a mixture containing cyclosiloxanes of from 3 to 30 silicon atoms to a temperature in the range of from about 10° C. to about 300° C. in the presence of 1–200 wt. ppm of a platinum hydrosilylation catalyst for a time in the range of from about 1 minute to about 600 minutes. When the polymer is placed in a non- oxidizing atmosphere, such as nitrogen, and pyrolyzed at a temperature in the range from about 800° C. to about 1400° C. for a time in the range of from about 1 hour to about 300 hours, black glass results. The polymer formation takes advantage of the fact that a silicon-hydride will react with a silicon-vinyl group to form a silicon-carbon-carbon-silicon bonded chain, thereby forming a network polymer. For this reason, each monomer cyclosiloxane must contain either a silicon-hydride bond or a silicon-vinyl bond or both. A silicon-hydride bond refers to a silicon atom bonded directly to a hydrogen atom and a silicon-vinyl bond refers to a silicon atom bonded directly to an alkene carbon, i.e., it is connected to another carbon atom by a double bond.

The polymer precursor for the black glass ceramic may be defined generally as the reaction product of (1) a cyclosiloxane monomer having the formula

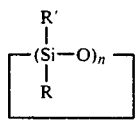

where n is an integer from 3 to 30, R is hydrogen, and R' is an alkene of from 2 to 20 carbon atoms in which one vinyl carbon atom is directly bonded to silicon or (2) two or more different cyclosiloxane monomers having the formula of (1) where for at least one monomer R is hydrogen and R' is an alkyl group having from 1 to 20 carbon atoms and for the other monomers R is an alkene from about 2 to 20 carbon atoms in which one vinyl carbon is directly bonded to silicon and R' is an alkyl group of from 1 to 20 carbon atoms, or (3) cyclosiloxane monomers having the formula of (1) where R and R' are independently selected from hydrogen, an alkene of from 2 to about 20 carbon atoms in which one vinyl carbon atom is directly bonded to silicon, or an alkyl group of from 1 to about 20 carbon atoms and at least some of said monomers contain each of said hydrogen, alkene, and alkyl moieties, said reaction taking place in the presence of an effective amount of hydrosilylation catalyst.

The black glass ceramic may be prepared from a cyclosiloxane polymer precursor wherein both the requisite silicon-hydride bond and the silicon-vinyl bond are present in one molecule, for example, 1,3,5,7-tetravinyl-1,3,5,7-tetrahydro-cyclotetrasiloxane. Such monomers may also contain alkyl groups such as, for example, 1,3-divinyl-1,5-dihydro-3,5,7,7-tetramethylcyclosiloxane. Alternatively, two or more cyclosiloxane monomers may be polymerized. Such monomers would contain at least either a silicon hydride bond or a silicon-vinyl bond and the ratio of the two types of bonds should be about 1:1, more broadly about 1:9 to 9:1.

Examples of such cyclosiloxanes include, but are not limited to:

1,3,5,7-tetramethyltetrahydrocyclotetrasiloxane,
1,3,5,7-tetravinyltetrahydrocyclotetrasiloxane,
1,3,5,7-tetravinyltetraethylcyclotetrasiloxane,
1,3,5,7-tetravinyltetramethylcyclotetrasiloxane,
1,3,5-trimethyltrivinylcyclotrisiloxane,
1,3,5-trivinyltrihydrocyclotrisiloxane,
1,3,5-trimethyltrihydrocyclotrisiloxane,
1,3,5,7,9-pentavinylpentahydrocyclopentasiloxane,
1,3,5,7,9-pentavinylpentamethylcyclopentasiloxane,
1,1,3,3,5,5,7,7-octavinylcyclotetrasiloxane,
1,1,3,3,5,5,7,7-octahydrocyclotetrasiloxane,
1,3,5,7,9,11-hexavinylhexamethylcyclohexasiloxane,
1,3,5,7,9,11-hexamethylhexahydrocyclohexasiloxane,
1,3,5,7,9,11,13,15,17,19-decavinyldecahydrocyclodecasiloxane,
1,3-divinyl-1,5-dihydro-3,5,7,7tetramethylcyclosiloxane
1,3,5-trivinyl-1,3,5,7,7pentamethylcyclotetrasiloxane
1,3,5-trihydro-1,3,5,7,7pentamethylcyclotetrasiloxane
1,3,5,7,9,11,13,15,17,19,21,23,25,27,29-pentadeca-vinyl-1,3,5,7,9,11,13,15,17,19,21,23,25,27,29-pentadecahydrocyclopentadecasiloxane
1,3,5,7-tetrapropenyltetrahydrocyclotetrasiloxane,
1,3,5,7-tetrapentenyltetrapentylcyclotetrasiloxane and
1,3,5,7,9-pentadecenylpentapropylcyclopentasiloxane.

It will be understood by those skilled in the art that while the siloxane monomers may be pure species, it will be frequently desirable to use mixtures of such monomers, in which a single species is predominant. Mixtures in which the tetramers predominate have been found particularly useful.

While the reaction works best if platinum is the hydrosilylation catalyst, other catalysts such as cobalt and manganese carbonyl will perform adequately. The catalyst can be dispersed as a solid or can be used as a solution when added to the cyclosiloxane monomer. With platinum, about 1 to 200 wt. ppm, preferably 1 to 50 wt. ppm as the metal will be employed as the catalyst.

Black glass precursor polymer may be prepared from either bulk or solution polymerization. In bulk polymerization, neat monomer liquid, i.e., without solvents, reacts to form oligomers or high molecular weight polymers. In bulk polymerization, a solid gel can be formed without entrapping solvent. It is particularly useful for impregnating porous composites to increase density. Solution polymerization refers to polymerizing monomers in the presence of an unreactive solvent.

The resin used in impregnating fibers to form prepreg in our invention preferably is prepared by solution polymerization. The advantage of solution polymerization is the ease of controlling resin characteristics. It is possible but very difficult to produce B-stage resin suitable for prepregs with consistent characteristics by bulk polymerization. In the present invention, soluble resin with the desirable viscosity, tackiness, and flowability suitable for prepregging and laminating can be obtained consistently using solution polymerization process. The production of easily handleable and consistent resin is very critical in composite fabrication.

Fibers

Reinforcing fibers useful in the composite skins of the invention are refractory fibers which are of interest for applications where superior physical properties are needed. They include such materials as boron, silicon carbide, graphite, silica, quartz, S-glass, E-glass, alumina, aluminosilicates, boron nitride, silicon nitride, silicon carbonitride, silicon oxycarbonitride, boron carbide, titanium boride, titanium carbide, zirconium oxide, and zirconia-toughened alumina. The fibers may have various sizes and forms. They may be monofilaments from 1 μm to 200 μm diameter or tows of 200 to 2000 filaments. When used in composites of the invention they may be woven into fabrics, pressed into mats, or unidirectionally aligned with the fibers oriented as desired to obtain the needed physical properties.

An important factor in the performance of the black glass composites is the bond between the fibers and the black glass matrix. Consequently, where improved mechanical strength and toughness are desired, the fibers are provided with a carbon, boron nitride, or other coating which reduces the bonding between the fibers and the black glass matrix. The surface sizings found on fibers as received or produced may be removed by solvent washing or heat treatment and the coating applied. Various methods of depositing carbon coatings may be used, including chemical vapor deposition, solution coating, and pyrolysis of organic polymers such as carbon pitch and phenolics. One preferred technique is chemical vapor deposition using decomposition of methane or other hydrocarbons. Another method is pyrolysis of an organic polymer coating such as phenol-formaldehyde polymers cross-linked with such agents as the monohydrate or sodium salt of paratoluenesulfonic acid. Still another method uses toluene-soluble and toluene-insoluble carbon pitch to coat the fibers. Deposition of boron nitride may be accomplished by reaction of boron compounds such as boron chloride with ammonia.

Processing

As previously discussed, the black glass precursor is a polymer. It may be shaped into fibers and combined with reinforcing fibers or the black glass precursor may be used in solution for coating or impregnating reinforcing fibers. Various methods will suggest themselves to those skilled in the art for combining the black glass precursor with reinforcing fibers. It would, for example, be feasible to combine fibers of the polymer with fibers of the reinforcing material and then to coat the resulting fabric or mat. Alternatively, the reinforcing fibers could be coated with a solution of the polymer and then formed into the desired shape. Coating may be done by dipping, spraying, brushing, or the like.

In one method, a continuous fiber is coated with a solution of the black glass precursor polymer and then wound on a rotating drum covered with a release film which is easily separated from the coated fibers. After sufficient fiber has been built up on the drum, the process is stopped and the unidirectional fiber mat removed from the drum and dried. The resulting mat (i.e., "prepreg") then may be cut and laminated into the desired shapes.

In a second method, a woven or pressed fabric of the reinforcing fibers is coated with a solution of the black glass precursor polymer and then dried, after which it may be formed into the desired shapes by procedures which are familiar to those skilled in the art of fabricating structures with the prepreg sheets. For example, layers of prepreg sheets may be laid together, heated and pressed into the needed shape. The orientation of the fibers may be chosen to strengthen the composite part in the principal load-bearing directions.

Solvents for the black glass precursor polymers include hydrocarbons, such as isooctane, toluene, benzene, and xylene, ethers, such as tetrahydrofuran, and ketones, such as methyl ethyl ketone. Concentration of the prepregging solution may vary from about 10% to about 70% of resin by weight. Precursor polymer used in impregnating the fibers is usually prepared from solution polymerization of the respective monomers.

Since the precursor polymers do not contain any hydrolyzable functional groups, such as silanol, chlorosilane, or alkoxysilane, the precursor polymer is not water sensitive. No particular precaution is needed to exclude water from the solvent or to control relative humidity during processing.

The resin ages very slowly when stored at or below room temperatures as is evident from their shelf life of more than three months at these temperatures. The resin is stable both in the solution or in the prepreg. Prepregs stored in a refrigerator for three months have been used to make laminates without any difficulty. Also, resin solutions stored for months have been used for making prepregs successfully.

Large and complex shape ceramic insulating bodies can be fabricated from laminating prepregs on the insulating substrate. One method is hand lay-up. Several plies of prepregs cut to the desired shape are laid-up on the substrate to achieve the required thickness of the layer. Fiber orientation can be tailored to give maximum strength in the preferred direction. Fibers can be oriented unidirectionally [0], at 90 angles [0/90], at 45° angles [0/45 or 45/90], and in other combinations as desired. The laid-up plies are then bonded by vacuum compaction before autoclave curing. Another fabrication method is tape laying which uses pre-impregnated ribbons in forming composites. The resins can be controlled to provide the desired tackiness and viscosity in the prepreg for the lay-up procedures.

After lay-up of the prepreg skin on the insulating substrate, the composites are consolidated and cured by heating to temperatures up to about 250° C. under pressure. In one method, the composited prepreg on the substrate is placed in a bag, which is then evacuated and the outside of the bag placed under a pressure sufficient to bond the prepreg layers and to bond the prepreg to the substrate, say up to about 1482 kPa. The resin can flow into and fill up any voids between the fibers, forming a void-free green laminate skin. The resulting polymer-fiber composite is dense and is ready for conversion of the polymer to black glass ceramic. If an excessively cured prepreg is used, as is possible with the method of U.S. Pat. No. 4,460,640, there will be no adhesion between the plies and no flow of resin material and no bonding will occur.

Heating the composite to temperatures from about 800° C. up to about 1400° C. (pyrolysis) converts the polymer into a black glass ceramic containing essentially only carbon, silicon, and oxygen. Pyrolysis is preferably carried out in an inert atmosphere, although oxygen may be present provided the heating is carried out very rapidly, as discussed in our co-pending application having a docket number 82-2966. It is characteristic of the black glass prepared by pyrolyzing the cyclosiloxanes described above that the resulting black glass has a large carbon content, but is able to withstand exposure to temperatures up to about 1400° C. in air without oxidizing to a significant degree. Pyrolysis is usually carried out with a heating to the maximum temperature selected, holding at that temperature for a period of time determined by the size of the structure, and then cooling to room temperature. Little bulk shrinkage is observed for the black glass composites and the resulting structure typically has about 70-80% of its theoretical density.

Conversion of the polymer to black glass takes place between 430° C. and 950° C. Three major pyrolysis steps were identified by thermogravimetric analysis at 430° C.-700° C., 680° C.-800° C. and 780° C.-950° C. The yield of the polymer-glass conversion up to 800° C. is about 83%; the third pyrolysis mechanism occurring between 780° C. and 950° C. contributed a final 2.5% weight loss to the final product.

Since the pyrolyzed composite skin structure still retains voids, the skin structure may be increased in density by impregnating with a neat monomer liquid or solution of the black glass precursor polymer. The solution is then gelled by heating to about 50° C.-120° C. for a sufficient period of time. Following gelation, the polymer is pyrolyzed as described above. Repeating these steps, it is feasible to increase the density up to about 95% of the theoretical.

Insulating Substrates

Ceramics such as alumina, silica, alumina silicates, zirconia, magnesia, silicon nitride, silicon carbide, and the like may be formed into fibers, foams, or porous blocks which are useful as high temperature insulations. The insulating bodies are protected by applying a prepreg of fiber-reinforced black glass precursor polymers to the surfaces to be protected and are then consolidated cured, and pyrolyzed to black glass as described above. The black glass composite skin provides a rigid protective surface for the relatively fragile substrate, and enhances the resistance to impact damage, erosion, and flame.

EXAMPLE 1

Polymer Precursor Preparation

The cyclosiloxane having silicon-vinyl bond was poly(vinylmethylcyclosiloxane) (ViSi). The cyclosiloxane with a silicon-hydride bond was poly(methylhydrocyclosiloxane) (HSi). Both cyclosiloxanes were mixtures of oligomers, about 85% by weight being the cyclotetramer with the remainder being principally the cyclopentamer and cyclohexamer. A volume ratio of 59 ViSi/41 HSi was mixed with 22 wt. ppm of platinum as a platinum-cyclovinylmethylsiloxane complex in toluene to give a 10 vol. percent solution of the cyclosiloxane monomers. The solution was heated to reflux conditions (about 110° C.) and refluxed for about 1 hour. Then, the solution was concentrated in a rotary evaporator at 50° C. to a 25-35% concentration suitable for use in prepregging. The resin produced was poly(methylmethylenecyclosiloxane) (PMMCS). It was tacky at room temperature, but it was flowable at temperatures of about 70° C. or higher and thus suitable for use as a B-stage resin.

EXAMPLE 2

Two blocks of HTP silica insulation (supplied by Lockheed Missile & Space Systems) approximately 6"×6"×2"(152.4 mm×152.4 mm×50.8 mm) were coated with a black glass ceramic skin reinforced with Nicalon ® fabric (Dow Corning). One block was coated with a black glass polymer precursor of the type described in Example 1. Then, both blocks were bonded to a prepreg made by brush coating a square open weave Nicalon fabric having an areal weight of 269 g/m$^2$ with the black glass precursors of the type described in Example 1. After solvent was evaporated, the resin content of the prepreg was 43.7%. The fabric was then cut to 5.5"×5.5" (139.7 mm×139.7 mm) squares and placed on a Teflon release film on a flat plate and about 5 gm of a 3000 cp PMMCS liquid was applied as a bonding agent. Then the prepreg was applied to the HTP insulating block. A package was assembled in each case for pressing, curing, and bonding by placing the block on a 0.25" (6.35 mm) thick cork sheet and placing a steel caul plate on top of the Teflon release film. The package was pressed in a platen press to 100 psi (689.5 kpa) and heated to 100° C. over 90 minutes, held at 100° C. for 30 minutes more, heated to 160° C. over 90 minutes and then released from the press and allowed to cool freely. The prepreg was well bonded to the insulating block after the curing. The bonded blocks were then pyrolyzed in flowing nitrogen by heating to 875° C. over 8 hours and then cooling over 8 hours to room temperature. The black glass skin bonded to the block and provided a hard protective surface for the weaker insulating foam.

EXAMPLE 3

A black glass matrix reinforced with Nicalon fibers was applied to the interior and ends of three hollow cylinders, each 3" I.D. (76.2 mm) by 5" (127 mm) long and 2" (50.8 mm) thick made of compressed aluminosilicate ceramic fibers. Five layers of a carbon coated Nicalon 8H satin weave fabric coated with 40% by weight of a black glass precursor similar to that of Example 1 were placed on the inside of each hollow cylinder and extended over the end faces. The cylinders were put into a vacuum bag for autoclave curing. They were then heated in an autoclave at 150° C. for 2 hours and 100 psi (689 kPa) pressure to cure the resin and adhere the prepreg layers to the surface of the cylinders. The cured prepreg was then pyrolyzed to form a black glass skin under a nitrogen atmosphere by heating to 900° C. over 8 hours and cooling to room temperature again over 8 hours. The density of the resulting black glass skin was increased and porosity reduced by painting the surface with a 30% solution of black glass precursor in isooctane, drying for 3 hours and then pyrolyzing again in a 16 hour cycle with a maximum temperature of 900° C. as before. The weight of the first cylinder excluding the prepreg was 477 grams and after the first pyrolysis the combined weight of the cylinder and the black glass Nicalon skin was 634 grams. Four successive additions of the black glass solutions increased the total weight to 663 gms, 668 gms, 675 gms, and 678 gms, respectively. The second cylinder excluding the prepreg weighed 445 gms and after the first pyrolysis the combined weight of the skin and the cylinder was 585 gms, which was later increased by four additions of black glass solutions to 605 gms, 616 gms, 621 gms, and 623 gms.

The third cylinder was heat treated at 1471° F. (800° C.) for 8 hours in air to pre-shrink the insulation. The temperature was raised to the maximum and reduced again at the rate of 300° F. (149° C.) per hour. The weight of the cylinder excluding the prepreg was 204 gms and after the first pyrolysis the combined weight of the skin and cylinder was 368 gms. Successive additions of black glass solutions and pyrolysis increased the combined weight to 380 gms, 388 gms, 392 gms, and 394 gms, respectively. The black glass skin bonded to the cylinders and conformed to their shape. The skin was hard and resistant to mechanical damage, erosion, and flame.

EXAMPLE 4

Black glass-Nicalon reinforced skins were applied to two types of a proprietary metal oxide fibrous insulation considered for aerobrakes for space vehicles. Procedures similar to those described in Examples 2 and 3 were used.

The insulating material was heated in air following the schedule: 240° C./hr to 900° C., hold for 1 hr, cool down to 23° C. at 240° C./hr. This preheating was intended to preshrink and condition the insulation before the prepreg was applied. A prepreg made of 8-harness satin weave Nicalon fabric with a carbon coating (Dow Corning), and a black glass precursor resin was applied to panels of the insulation material. The first layer contained 53 wt.% black glass precursor while succeeding layers contained 47 wt.% precursor.

Two panels (3"×3"×0.5") (76.2 mm×76.2 mm×12.7 mm) were covered with four 5.5"×3.25" (139.7 mm×82.6 mm) plies of prepreg on one side and the ends. The prepreg-covered insulation panels were then autoclaved at 150° C. for 4 hours while inside a vacuum bag to cure the prepreg.

Two additional panels (6"×6"×0.5") (152.4 mm×152.4 mm×12.7 mm) were covered with similar manner except that only the first and fourth plies were wrapped over the edges of the panels.

The cured panels were pyrolyzed in flowing nitrogen at a maximum temperature of 900° C. over a 16-hour schedule as previously described.

Subsequently, infiltration of the first black glass-Nicalon skin with black glass precursor solutions was carried out as described above, but for three cycles only. Both high (75 cp) and low (10 cp) viscosity black glass precursor solutions were used.

We claim:

1. A method of applying fiber-reinforced glass ceramic composite skin to ceramic insulating bodies comprising:
   (a) reacting (1) a cyclosiloxane monomer having the formula

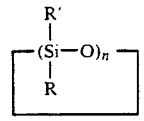

where n is an integer from 3 to 30, R is hydrogen, and R' is an alkene of from 2 to 20 carbon atoms in which one vinyl carbon atom is directly bonded to silicon or (2) two or more different cyclosiloxane monomers having the formula of (1) where for at least one monomer R is hydrogen and R' is an alkyl group having from 1 to 20 carbon atoms and for the other monomers R is an alkene from 2 to 20 carbon atoms in which one vinyl carbon is directly bonded to silicon and R' is an alkyl group of from 1 to 20 carbon atoms, or (3) cyclosiloxane monomers having the formula of (1) where R and R' are independently selected from hydrogen, an alkene of from 2 to about 20 carbon atoms in which one vinyl carbon atom is directly bonded to silicon, or an alkyl group of from 1 to about 20 carbon atoms and at least some of said monomers contain each of said hydrogen, alkene, and alkyl moieties, said reaction taking place in the presence of an effective amount of hydrosilylation catalyst;
   (b) applying the reaction product of (a) to at least one refractory fiber selected from the group consisting of boron, silicon carbide, graphite, silica, quartz, S-glass, E-glass, alumina, aluminosilicate, boron nitride, silicon nitride, silicon carbonitride, silicon oxycarbonitride, boron carbide, titanium boride, titanium carbide, zirconium oxide, and zirconia-toughened alumina to form a prepreg;
   (c) laying-up plies of the prepreg of (b) on a ceramic insulating body free of the reaction product of (a) to form a bonded green structure;
   (d) pressing the green structure of (c) at a pressure above about 100 kPa and at a temperature above about 40° C. to bond the plies of the prepreg of (b) to the ceramic insulating body;
   (e) curing the bonded structure of (d) at a temperature not greater than 250° C.;
   (f) pyrolyzing the cured structure of (e) at a temperature of about 800° C. to about 1400° C. to form a glass ceramic;
   (g) recovering the pyrolyzed product of (f) as the fiber-reinforced glass ceramic composite applied to the ceramic insulating body;

2. The method of claim 1 further comprising the steps of
   (h) impregnating the pyrolyzed product of (g) with the reaction product of (a);
   (i) pyrolyzing the impregnated product of (h) at 800° C.–1400° C.;
   (j) repeating steps (h) and (i) to further increase the density of said fiber-reinforced glass composite applied to the ceramic insulating body.

3. The method of claim 1 wherein the pyrolysis step (f) is carried out in a non-oxidizing atmosphere.

4. The method of claim 1 wherein said ceramic insulating bodies comprise ceramics selected from the group consisting of alumina, silica, alumina silicates, zirconia, magnesia, silicon nitride, and silicon carbide.

5. The method of claim 1 wherein said ceramic insulating bodies are in the form of fibers, foam, or insulating blocks.

* * * * *